United States Patent
Giladi (10) Patent No.: US 9,900,289 B2
(45) Date of Patent: *Feb. 20, 2018

(54) LOW-LATENCY SECURE SEGMENT ENCRYPTION AND AUTHENTICATION INTERFACE

(71) Applicant: Futurewei Technologies, Inc., Plano, TX (US)

(72) Inventor: Alexander Giladi, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,161

(22) Filed: Aug. 8, 2016

(65) Prior Publication Data

US 2016/0344706 A1 Nov. 24, 2016

Related U.S. Application Data

(63) Continuation of application No. 13/934,837, filed on Jul. 3, 2013, now Pat. No. 9,444,794.

(60) Provisional application No. 61/667,657, filed on Jul. 3, 2012.

(51) Int. Cl.
*H04L 29/06* (2006.01)
*H04L 9/08* (2006.01)

(52) U.S. Cl.
CPC .......... *H04L 63/0428* (2013.01); *H04L 9/083* (2013.01); *H04L 63/168* (2013.01)

(58) Field of Classification Search
CPC .... H04L 63/0428; H04L 63/168; H04L 9/083
See application file for complete search history.

(56) References Cited

U.S. PATENT DOCUMENTS

| | | |
|---|---|---|
| 6,055,316 A | 4/2000 | Periman et al. |
| 2002/0138736 A1 | 9/2002 | Morin |
| 2003/0204602 A1 | 10/2003 | Hudson et al. |
| 2005/0063380 A1 | 3/2005 | Kayalackakom et al. |
| 2006/0031249 A1* | 2/2006 | Peden ................. H04L 12/1877 |
| 2008/0313458 A1 | 12/2008 | Fascenda et al. |
| 2009/0328186 A1 | 12/2009 | Pollutro et al. |
| 2010/0246816 A1 | 9/2010 | Thomas et al. |
| 2012/0090036 A1 | 4/2012 | Kang et al. |
| 2012/0117261 A1* | 5/2012 | Bouazizi ............. H04L 65/1069 709/231 |

(Continued)

OTHER PUBLICATIONS

ISO/IEC 23009-4:2012, Information technology—Dynamic adaptive streaming over HTTP (DASH)—Part 4: Segment encryption and authentication, May 12, 2012, 21 pages.*

(Continued)

*Primary Examiner* — Michael Pyzocha
(74) *Attorney, Agent, or Firm* — Conley Rose, P.C.

(57) ABSTRACT

An apparatus comprising a memory, a processor coupled to the memory and configured to obtain a Dynamic Adaptive Streaming over Hypertext Transfer Protocol (HTTP) (DASH) Media Presentation Description (MPD) from an HTTP server, wherein the MPD describes a media presentation as at least one encrypted segment, and wherein the encrypted segment is associated with an availability time and a decryption key, and pre-fetch the decryption key associated with the encrypted segment by requesting the decryption key from a key server prior to the availability time of the encrypted segment.

14 Claims, 6 Drawing Sheets

(56) References Cited

U.S. PATENT DOCUMENTS

| | | | |
|---|---|---|---|
| 2012/0216038 A1 | 8/2012 | Chen et al. | |
| 2012/0240176 A1* | 9/2012 | Ma | H04N 21/23439 725/114 |
| 2012/0246258 A1* | 9/2012 | Zhang | H04W 56/00 709/213 |
| 2012/0331293 A1 | 12/2012 | Ma et al. | |
| 2013/0007223 A1* | 1/2013 | Luby | H04N 21/23106 709/219 |
| 2013/0042100 A1 | 2/2013 | Bouazizi et al. | |
| 2013/0132579 A1* | 5/2013 | Keum | H04W 8/22 709/225 |
| 2013/0191550 A1* | 7/2013 | Hannuksela | H04N 21/234327 709/231 |
| 2013/0290697 A1* | 10/2013 | Wang | H04L 63/0428 713/150 |
| 2013/0322628 A1 | 12/2013 | Rhyu et al. | |
| 2014/0020111 A1 | 1/2014 | Wang et al. | |

OTHER PUBLICATIONS

"Information Technology—Dynamic Adaptive Streaming Over HTTP (DASH)—Part 1: Media Presentation Description and Segment Formats," International Standard, ISO/IEC 23009-1, First Edition, Apr. 1, 2012, 134 pages.

"Information Technology—Dynamic Adaptive Streaming Over HTTP (DASH)—Part 4: Segment Encryption and Authentication," International Standard, ISO/IEC 23009-4, First Edition, Jul. 1, 2013, 32 pages.

Stockhammer, T., "MPEG's Dynamic Adaptive Streaming over HTTP (DASH)—Enabling Formats for Video Streaming over the Open Internet," Nov. 22, 2011, 54 pages.

Hartung, F., et al., "DRM Protected Dynamic Adaptive HTTP Streaming," MMSys, Proceedings of the Second Annual ACM Conference on Multimedia Systems, 2011, pp. 277-282.

Office Action dated Feb. 22, 2016, 16 pages, U.S. Appl. No. 13/934,837, filed Jul. 3, 2013.

Office Action dated Oct. 15, 2015, 12 pages, U.S. Appl. No. 13/934,837, filed Jul. 3, 2013.

Notice of Allowance dated May 19, 2015, 10 pages, U.S. Appl. No. 13/934,837, filed Jul. 3, 2013.

* cited by examiner

LOW-LATENCY SECURE SEGMENT ENCRYPTION AND AUTHENTICATION INTERFACE

CROSS-REFERENCE TO RELATED APPLICATIONS

This application is a continuation application of U.S. patent application Ser. No. 13/934,837 filed on Jul. 3, 2013 by Alexander Giladi and titled "Low-Latency Secure Segment Encryption and Authentication Interface," which claims priority to U.S. provisional patent application No. 61/667,657 filed on Jul. 3, 2012 by Alexander Giladi and titled "Low-Latency Secure Segment Encryption and Authentication Interface," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media contents to subscribers or users using different encryption and/or coding schemes suited for different devices, such as televisions, notebook computers, mobile handsets, etc. The media content provider may support a plurality of media encoder and/or decoders (codecs), media players, video frame rates, spatial resolutions, bit-rates, video formats, or combinations thereof. A piece of media content may be converted from a source or original representation to various other representations to suit the different user devices.

SUMMARY

In one embodiment, the disclosure includes an apparatus comprising a memory, a processor coupled to the memory and configured to obtain a Dynamic Adaptive Streaming over Hypertext Transfer Protocol (HTTP) (DASH) Media Presentation Description (MPD) from an HTTP server, wherein the MPD describes a media presentation as at least one encrypted segment, and wherein the encrypted segment is associated with an availability time and a decryption key, and pre-fetch the decryption key associated with the encrypted segment by requesting the decryption key from a key server prior to the availability time of the encrypted segment.

In another embodiment, the disclosure includes a computer program product comprising computer executable instructions stored on a non-transitory computer readable medium such that when executed by a processor cause a network element (NE) to obtain a DASH MPD from an HTTP server, wherein the MPD describes a media presentation as at least one encrypted segment, obtain a key associated with the encrypted segment by requesting the key from a key server, and subsequent to obtaining the key, create an initialization vector (IV) for the encrypted segment by performing an electronic codebook (ECB) mode encryption on a segment number of the encrypted segment by applying the key.

In another embodiment, the disclosure includes a method comprising transmitting a DASH MPD to a HTTP client, wherein the MPD describes a media presentation as at least one encrypted segment, subsequent to transmitting the MPD, receiving a request for the encrypted segment from the client, and in response to client request, transmitting the encrypted segment to the client with an inband message authentication code (MAC) for authentication of the response, wherein the encrypted segment and the MAC are transmitted in response to a single request.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A media content provider may transmit media content to client(s) by employing a DASH protocol. When employing DASH, a media content provider may, upon request, transmit an MPD file to the client. The MPD file may describe the media content as segments and may describe how such segments may be utilized to present the media content to a user. For example, the MPD file may describe segment timing, segment multiplexing (e.g. interrelation between audio segment and video segment timings), and/or Uniform Resource Locator (URL) information indicating where such segments may be obtained. DASH is discussed further in International Organization for Standardization/International Electrotechnical Commission (ISO/IEC) document 23009-1:2012(E) entitled "Information technology-Dynamic adaptive streaming over HTTP (DASH)—Part 1: Media presentation description and segment formats," which is incorporated by reference.

DASH may also support various forms of content protection. For example, segment(s) may be encrypted, and the MPD may comprise information which may be used by the client to decrypt and/or authenticate each segment prior to presentation to the user. DASH content protection is described further in ISO/IEC document 23009-4:2013(E) entitled "Information technology-Dynamic adaptive streaming over HTTP (DASH)—Part 4: Segment encryption and authentication," which is also incorporated by reference. DASH content protection may involve certain inefficiencies in some cases. For example, to perform decryption of media content, a client may require a key and/or an IV. A key and/or IV may be available for download by the client when the associated segment is available for download. In cases where a large number of users may wish to view the same media content at the same time (e.g. a broadcast sporting event), these users may simultaneously request a key and/or IV for a specified segment from a key server. The key server may have difficulty fulfilling all simultaneous requests, which may result in significant delay for individual users. Such a scenario may be referred to as a thundering herd problem. Repeated requests related to particular segment(s) may further exacerbate the thundering herd problem. For example, a client may obtain a MAC and/or other hash value, which may be used as a signature to verify that each segment received is the segment that the author/operator intended to provide. Such MAC requests may increase the amount of communication require prior to presentation and may further slow the system.

Disclosed herein are various embodiments, which may reduce the effects of the thundering herd problem. For example, a key for a specified segment may be available at the key server prior to an availability time of the segment. As such, a key and/or IV may be pre-fetched by a client to allow the segment to be decrypted and presented to the user upon receipt from an HTTP server. In another example embodiment, the key and/or IV may be associated with an availability window. Each client may employ a random value to determine when to fetch a key and/or IV. As such, a key and/or IV may be pre-fetched by a plurality of clients, and fetching requests may be spread out over time to balance the request load at the key server. In another embodiment, key server requirements may be further reduced by causing the client to derive the IV instead of requesting the IV from the key server. Specifically, the client may employ ECB mode encryption on a segment number of the segment to create an IV. The client may employ the same key and the same cipher used to decrypt the segment as part of the ECB mode encryption process. In yet another embodiment, the HTTP server may append the MAC to the end of each segment. The client may then verify that the segment was received from the HTTP server without requiring an additional request to the HTTP server.

Figure 1:
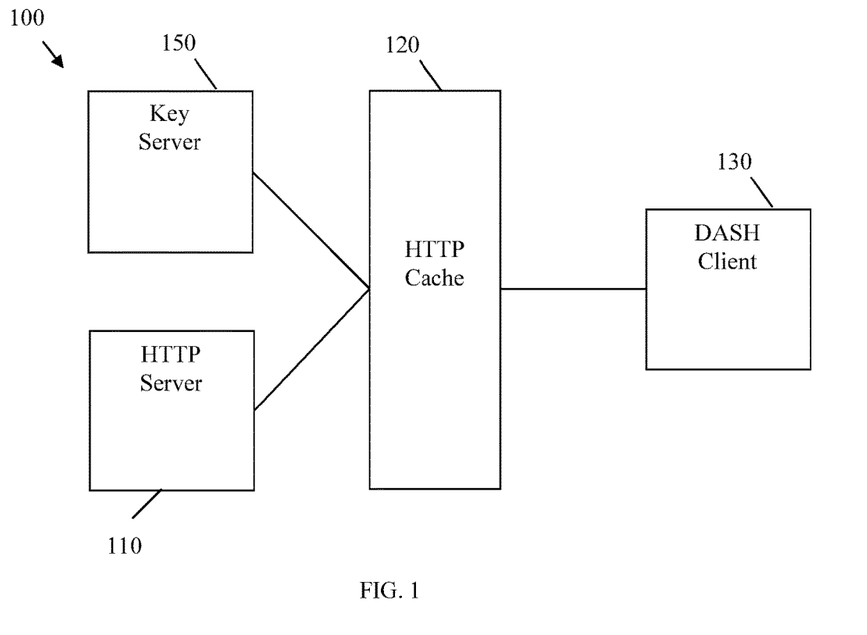
FIG. 1 is a schematic diagram of an embodiment of a DASH enabled network architecture.

FIG. 1 is a schematic diagram of an embodiment of a DASH enabled network 100 architecture. Network 100 may comprise an HTTP server 110, a key server 150, an HTTP cache 120, and a DASH client 130. A dash client 130 may request media content from an HTTP server 110 via an HTTP cache 120. The HTTP server 110 may respond by transmitting an MPD file to the DASH client 130. Based on the information in the MPD file, the client 130 may request segments from the HTTP server 110 and associated keys and/or IVs from the key server 150. Upon receiving the required components, the client 130 may decrypt the segments, arrange the media content contained in the segments according to the MPD, and present the media content to the user. Requests and responses may pass through HTTP cache 120, which may store associated data for faster access by the client 130.

HTTP server 110 may be any device configured to service HTTP requests from client 130. Key server 150 may be any device configured to service key and/or IV requests from client 130. HTTP server 110 and key server 150 may be located on the same device, on different devices, or spread amongst a cluster of devices. For example, HTTP server 110 and/or key server 150 may comprise dedicated servers positioning a data center. As another example, HTTP server 110 and/or key server 150 may operate as virtual machines (VMs) in a cloud computing environment. The HTTP server 110 may also be part of a content provider network or may be a node in a content distribution network (CDN). HTTP server 110 may populate an MPD file with information indicting URLs and/or a URL scheme, which may allow the client 130 to locate segment data. HTTP server 110 may further populate the MPD file with information indicting URLs and/or a URL scheme, which may allow the client 130 to locate the associated keys and/or IVs at the key server 150. HTTP server 110 may further populate the MPD file with any information the client 130 may require to present the data, such as period information, timing, segment format information, multiplexing information, etc. HTTP 110 may then transmit the MPD file to the client 130 upon request. HTTP server 110 may also transmit segments and/or MACs to the client 130 upon request.

HTTP cache 120 may be any device configured to temporarily store information for rapid access by the client 130. For example, HTTP cache 120 may be a browser cache, which may be a software based cache stored on the client 130, a proxy cache, which may be a shared cache on the client's 130 network, a gateway cache, which may be a shared cache installed in the same network as key server 105 and/or HTTP server 110, or combinations thereof. HTTP cache 120 may store segment data, MPD files, keys, IVs, MACs, ciphers, and/or any other data the client 130 may require to present the media content. Upon receiving client 130 requests, the cache 120 may determine if the requested data is already stored in the cache 120. If the data is stored, the cache 120 may respond to the client's 130 request without forwarding the request to servers 110 and/or 150. If the requested data is not stored in the cache 120, the cache 120 may forward the request to the appropriate server, receive an associated response, forward the response to the requesting client 130, and/or save any data from the response for later use by the same or a different client 130.

A DASH client 130 may be a device configured to obtain media content via a DASH protocol and present such media content to a user, such as a mobile phone, personal computer (PC), Internet Protocol (IP) television (TV), IP TV set top box, laptop PC, internet radio device, tablet PC, media storage device, etc. The DASH client 130 may directly present the media content (e.g. visual data via a screen, audio data via a speaker, etc.) and/or may save and/or transmit the media content to other device(s) for presentation. The DASH client 130 may request an MPD file, for example via an HTTP GET request. The client 130 may then review the MPD file to determine URLs for keys, IVs, MACs, ciphers, segments, etc. The DASH client 130 may also obtain any keys, IVs, MACs, ciphers, segments, etc., needed to display the media content, for example via an HTTP GET request(s) to the key server 150 and/or HTTP server 110. Upon receiving the necessary information, the DASH client 130, may decrypt the segment(s) with the cipher(s), key(s), and/or IVs, authenticate the segments(s)

with the MAC, select and/or multiplex the segment data as directed by the MPD, and present the media content to the user and/or transmit the media content to another device for storage and/or presentation to the user. It should be noted that while only one DASH client 130 is shown for purposes of clarity, there may be many DASH clients 130 that may request the same and/or different media presentations from an HTTP server 110 at any specified time.

Figure 2:
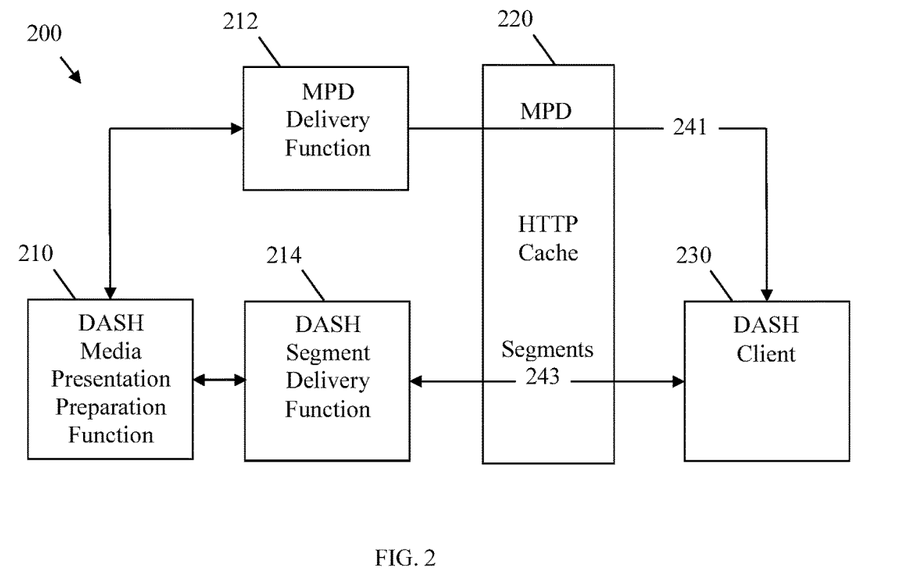
FIG. 2 is a schematic diagram of an embodiment of a DASH delivery process model.

FIG. 2 is a schematic diagram of an embodiment of a DASH delivery process model 200. Model 200 may comprise a DASH media presentation preparation function 210 which may be implemented on a HTTP server such as HTTP server 110, a content provider server, etc. Model 200 may further comprise a MPD delivery function 212 and a DASH segment delivery function 214, which may be implemented on a HTTP server such as HTTP server 110. Model 200 may further comprise a HTTP cache 220 and a DASH client 230, which may be substantially similar to HTTP cache 120 and DASH client 130, respectively. DASH media presentation preparation function 210, MPD delivery function 212, and DASH segment delivery function 214 may operate to transmit an MPD 241 and associated segments 243 to DASH client 230 via HTTP cache 220.

DASH media presentation preparation function 210 may be configured to prepare a media presentation for viewing by a DASH client 230. For example, the DASH media presentation preparation function 210 may receive data regarding media content from a CDN and may prepare an MPD to describe the media content. The MPD may list URLs for keys, IVs, ciphers, segments, and/or MACs. The MPD may list such URLs as static addresses and/or as functions that may be used to determine associated URLs. The MPD may be created using Extensible Markup Language (XML). An MPD may comprise information for one or more periods. Each period may comprise one or more adaptation sets. Each adaptation set may comprise one or more representations. Each representation may comprise one or more segments. A period may comprise timing data and may represent a content period during which a consistent set of encoded versions of the media content is available (e.g. a set of available bitrates, languages, captions, subtitles etc. that do not change). An adaptation set may represent a set of interchangeable encoded versions of one or several media content components. For example, a first adaptation set may comprise a main video component, a second adaptation set may comprise a main audio component, a third adaptation set my comprise captions, etc. An adaptation set may also comprise multiplexed content, such as combined video and audio. A representation may describe a deliverable encoded version of one or more media content components, such as an International Organization for Standardization (ISO) base media file format (ISO-BMFF) version, a Moving Picture Experts Group (MPEG) version two transport system (MPEG-2 TS) version, etc. A representation may describe, for example, any needed codecs, encryption and/or other data needed to present the media content. A client 230 may dynamically switch between representations based on network conditions, device capability, user choice, etc., which may be referred to as adaptive streaming. Each segment may comprise the media content data, may be associated with a URL, and may be retrieved by the client 230, e.g. with an HTTP GET request. Each segment may contain a predefined byte size (e.g., 1,000 bytes) and/or an interval of playback time (e.g., 2 or 5 seconds) of the media content. A segment may comprise the minimal individually addressable unit of data that can be downloaded using URLs advertised via the MPD. The periods, adaptation sets, representations, and/or segments may be described in terms of attributes and elements, which may be modified to affect the presentation of the media content by the client device 230. Upon preparing the MPD, the DASH media presentation preparation function 210 may deliver the MPD to the MPD delivery function 212.

The client 230 may request the MPD 241 be delivered by the MPD delivery function 212. The MPD delivery function 212 may respond with the MPD 241 via the HTTP cache 220. Based on the address data in the MPD, the client 230 may request appropriate segments 243 from the DASH segment deliver function 214. It should be noted that segments 243 may be retrieved from a plurality of DASH segment deliver functions 214 and/or from a plurality of URLs and/or physical locations. The client 230 may present the retrieved segments 243 based on the instructions in the MPD 241.

Figure 3:
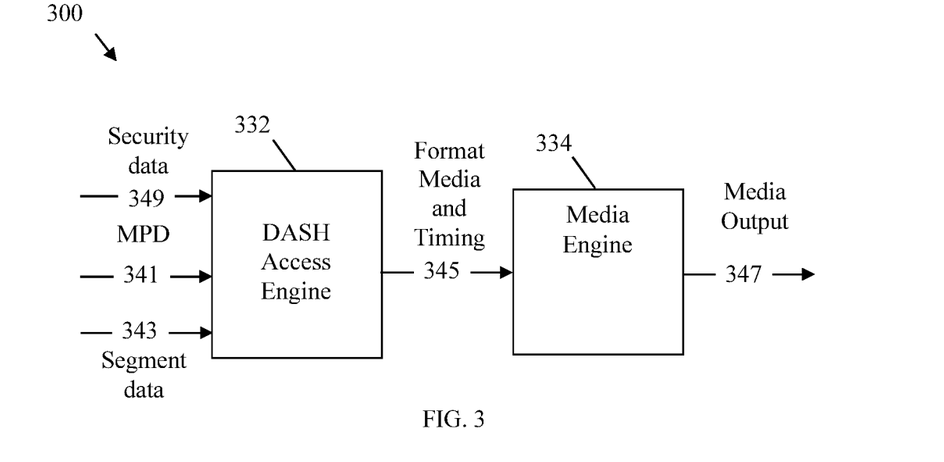
FIG. 3 is a schematic diagram of an embodiment of a DASH client process model.

FIG. 3 is a schematic diagram of an embodiment of a DASH client process model 300. Model 300 may comprise a DASH access engine 332 and a media engine 334, which may be implemented in a DASH client, such as DASH clients 130 and/or 230. DASH access engine 332 may be any component configured to interpret an MPD, request media data, and receive such data. For example, DASH access engine 332 may request an MPD 341, such as MPD 241, from a MPD delivery function, such as MPD delivery function 212. Based on the MPD 341, DASH access engine 332 may also request segment data 343 from a dash segment delivery function, such as dash segment delivery function 214. Also based on the MPD 341, the DASH access engine 332 may request any security data 349, such as MACs from an HTTP server to authenticate the segment data 343 and/or ciphers, IVs, and/or keys from a key server such as key server 150 to decrypt the segment data 343. Once the segment data 343 has been decrypted and authenticated, the DASH access engine 332 may forward the format, media, and/or timing 345 to the media engine 334. The media engine 334 may be any component configured to receive the format, media, and/or timing 345 and prepare media output 347 based on the format, media, and/or timing 345. The media output 347 may be stored and/or transmitted to a component for presentation to a user (e.g. a screen, speaker, etc.)

Figure 4:
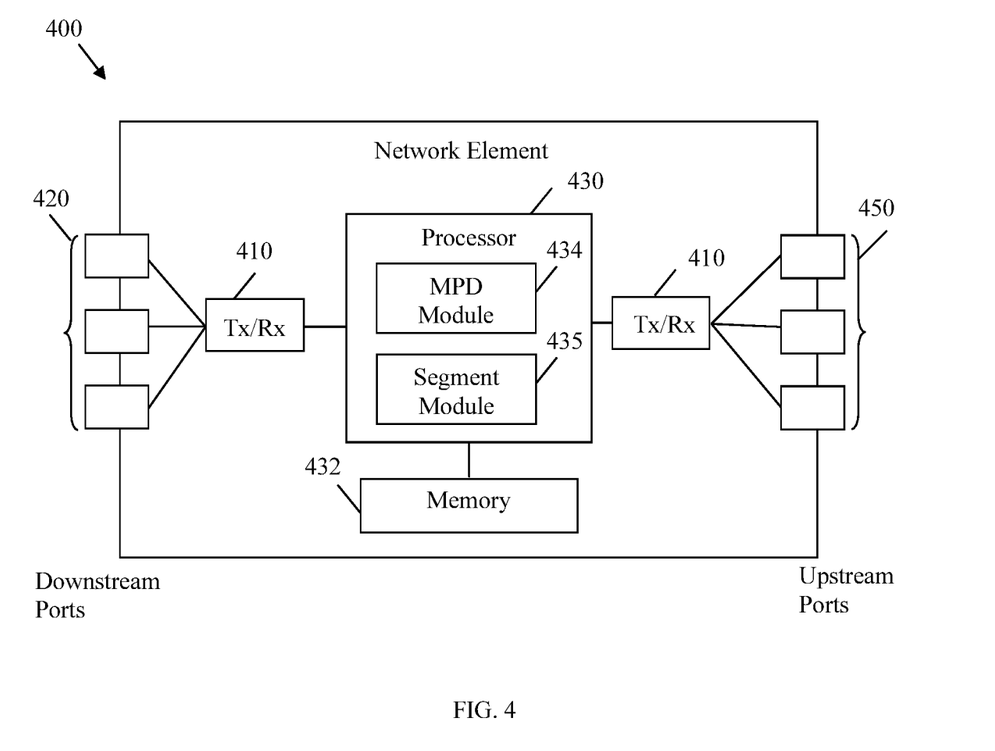
FIG. 4 is a schematic diagram of an embodiment of a NE which may act as a DASH server.

FIG. 4 is a schematic diagram of an embodiment of a NE 400 which may act as a DASH server, such as HTTP server 110, a key server 150, a DASH media presentation preparation function 210, a MPD delivery function 212, and/or a DASH segment delivery function 214, within a network and/or model such as network 100 and/or model 200, and may be configured to generate MPDs and/or transmit segments to a DASH client such as DASH client 130, and/or 230. NE 400 may be implemented in a single node or the functionality of NE 400 may be implemented in a plurality of nodes in a CDN, or other content based network. In some embodiments NE 400 may also act as other node(s) in network 100 and/or model 200. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 400. For instance, the features/methods in the disclosure may be implemented using hardware, firmware, and/or software installed to run on hardware. The NE 400 may be any device that transports frames through a network, e.g., a switch, router, bridge, server, a client, etc. As shown in FIG. 4, the NE 400 may comprise transceivers (Tx/Rx) 410, which may be transmitters, receivers, or combinations thereof. A Tx/Rx 410 may be coupled to plurality of downstream ports 420 (e.g. downstream interfaces) for transmitting and/or receiving frames from other nodes and a Tx/Rx 410 coupled to plurality of upstream ports 450 (e.g. upstream interfaces) for transmitting and/or receiving frames from other nodes, respectively. A processor 430 may be coupled to the Tx/Rxs 410 to process the frames and/or determine which nodes to send frames to. The processor 430 may comprise one or more multi-core processors and/or memory devices 432, which may function as data stores, buffers, etc. Processor 430 may be implemented as a general processor or may be part of one or more application specific integrated circuits (ASICs) and/or digital signal processors (DSPs). Processor 430 may comprise an MPD module 434 and/or a segment module 435. The MPD module 434 may prepare an MPD and/or forward the MPD toward a client upon request. The segment module 435 may forward segments toward the client upon request. In an alternative embodiment, the MPD module 434 and/or a segment module 435 may be implemented as instructions stored in memory 432, which may be executed by processor 430. In another alternative embodiment, the MPD module 434 and the segment module 435 may be implemented on separate NEs. The downstream ports 420 and/or upstream ports 450 may contain electrical and/or optical transmitting and/or receiving components.

It is understood that by programming and/or loading executable instructions onto the NE 400, at least one of the processor 430, MPD module 434, segment module 435 downstream ports 420, Tx/Rxs 410, memory 432, and/or upstream ports 450 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
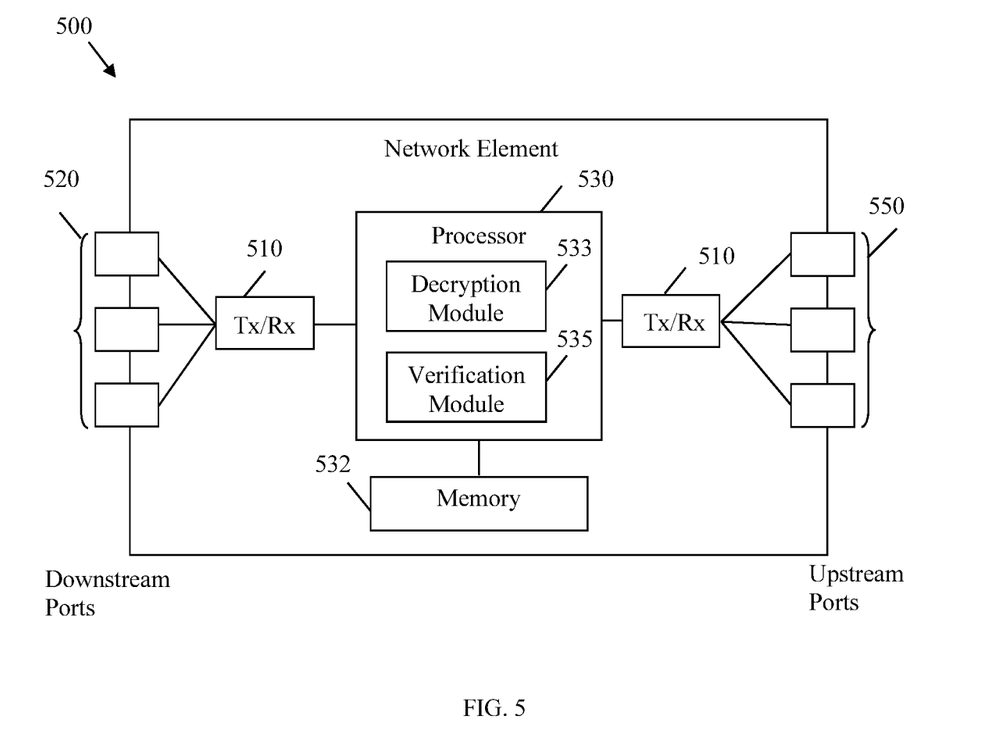
FIG. 5 is a schematic diagram of an embodiment of a general purpose processor.

FIG. 5 is a schematic diagram of an embodiment of a NE 500 which may act as a DASH client, such as DASH client 130 and/or DASH client 230, and may be configured to implement DASH client model 300. NE 500 may comprise downstream ports 520, upstream ports 550, Tx/Rxs 510, a processor 530, and a memory 532, which may be substantially similar to downstream ports 420, upstream ports 450, Tx/Rxs 410, processor 430, and memory 432. NE 500 may further comprise a decryption module 533, which may be configured to pre-fetch keys (e.g. obtain keys and/or IVs for an encrypted segment prior to the encrypted segment becoming available for download according to method 600 as discussed below), derive IVs (e.g. based on segment number and ECB mode encryption according to method 700 as discussed below), and/or decrypt encrypted segments, for example by using key(s), IV(s), and/or cipher(s) on the segments' data. NE 500 may further comprise a verification module 535, which may be configured to authenticate segments (e.g. by obtaining inband signatures according to method 800 as discussed below). In an alternative embodiment, the decryption module 533 and/or verification module 535 may be implemented as instructions stored in memory 532, which may be executed by processor 530. In another alternative embodiment, the decryption module 533 and/or verification module 535 may be implemented on separate NEs.

Figure 6:
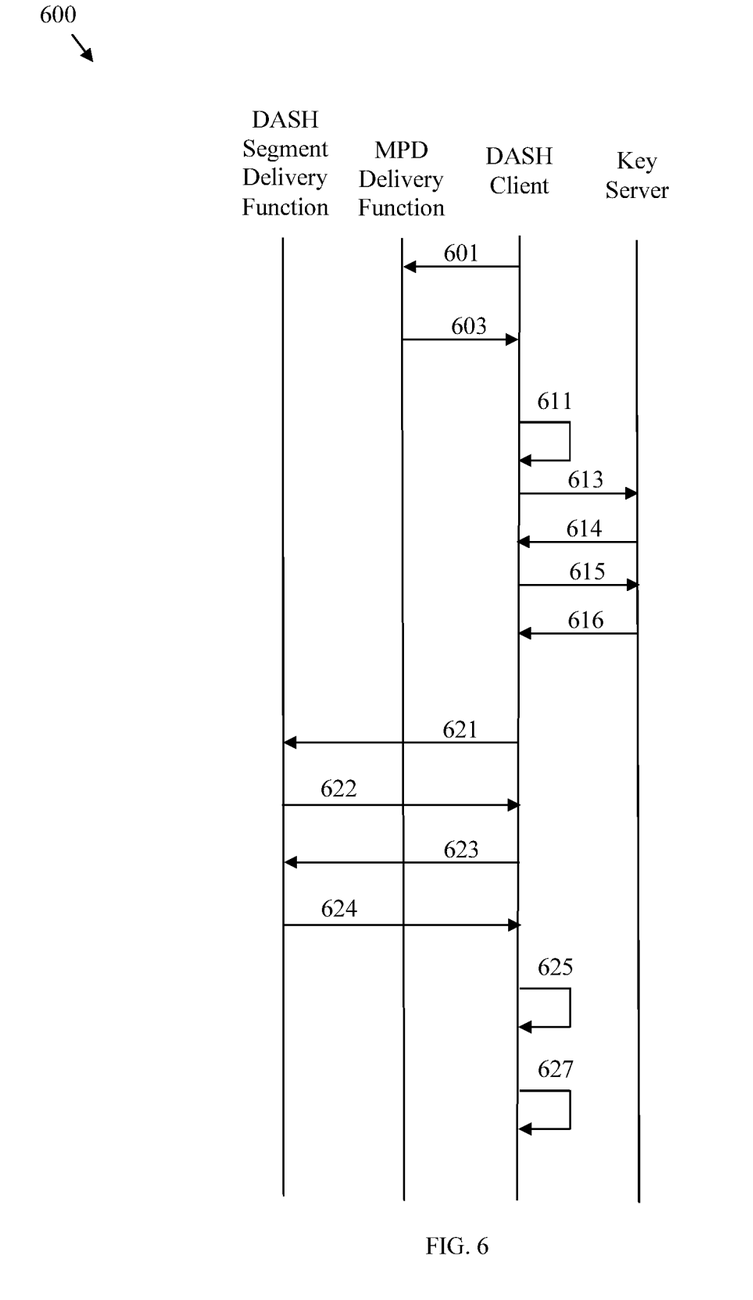
FIG. 6 is a protocol diagram of an embodiment of a method of pre-fetching DASH encryption data.

FIG. 6 is a protocol diagram of an embodiment of a method 600 of pre-fetching DASH encryption data. At step 601 a DASH client, such as DASH client 130 and/or 230, may obtain a DASH MPD from an HTTP server (e.g. HTTP server 110) by transmitting a request for the MPD (e.g. a HTTP GET request) to a HTTP server MPD delivery function, such as MPD delivery function 212. At step 603, the MPD delivery function may transmit the request MPD to the DASH client. At step 611, the DASH client may process the MPD (e.g. by employing a DASH Access Engine 332). The MPD may indicate that the associated media presentation comprises at least one encrypted segment with an associated availability time. An availability time may be a time at which the segment is available for download from the HTTP server and/or segment delivery function. The MPD may further indicate that the encrypted segment is associated with a key and/or an IV and that the key and/or IV is associated with an availability window. An availability window may indicate a time range before the availability time of the segment, during which a key and/or IV may be pre-fetched. For example, a key may be available at least one second before the segment becomes available. As another example, a key may comprise an availability window of five to one second prior to the availability time of the segment. The MPD may further indicate a request time during the availability window, and/or a function, such as a random value function, to determine a request time during the availability window. The MPD may also indicate a URL for the key, IV, and/or segment. Based on the MPD, the DASH client may pre-fetch the key and/or the IV during the availability window and prior to the segment availability time.

Based on the MPD information, at step 613 the DASH client may determine the URL of the key and transmit a request (e.g. an HTTP GET request) to a key server, such as key server 150, an associated request time. At step 614, the key server may transmit the requested key to the DASH client. At step 615, the DASH client may transmit a request (e.g. an HTTP GET request) to the key server for the IV. At step 616, the key server may respond with the IV. In some embodiments, the key and the IV may be retrieved using a single request message exchange (e.g. 613-614). It should be noted that steps 613-616 may all occur during the availability window and prior to the segment availability time. As such, the key and/or IV may be pre-fetched at the conclusion of step 616.

At step 621, the DASH client may transmit a request (e.g. a HTTP GET request) to a DASH segment delivery function, such as DASH segment delivery function 214, at the URL specified by the MPD. The client may not transmit the request of step 621 until the segment availability time. At step 622, the DASH segment delivery function may transmit the requested segment to the DASH client. At step 623, the DASH client may transmit a request (e.g. a HTTP GET request) to the DASH segment delivery function for a MAC. At step 624, the DASH segment delivery function may respond with a MAC. At step 625, the DASH client may decrypt the segment using the key received at step 614, the IV received at step 616, and a cipher as specified by the MPD. At step 627, the DASH client may authenticate the segment using the MAC received at step 624. Once the segment has been authenticated and decrypted, the segment may be forwarded to a media engine such as media engine 334 for presentation to a user. It should be noted that the key of steps 613-614 and the IV of steps 615-616 may be fetched in any order. It should also be noted that the segment may be authenticated then decrypted or decrypted then authenticated.

As noted above, the MPD may indicate to a DASH client that a key may be pre-fetched according to method 600. For example, an adaptation set and/or a representation with which an encrypted segment may be associated may comprise a ContentProtection element. The ContentProtection element may comprise an @availabilityWindow attribute that may be conditionally mandatory (e.g. mandatory when content protection is used). As shown below, the @availabilityWindow attribute may be employed indicate a key availability window as a temporal distance between the time a key and/or IV may first be fetched and the availability time of the segment.

| Element or Attribute Name | Use | Description |
|---|---|---|
| ContentProtection | | |
| @availabilityWindow | CM | In case MPD@type = 'dynamic', distance between the time a key and an IV can be fetched using the provided URL's and the availability time of the first segment encrypted using these keys. May be present if and only if MPD@type = 'dynamic'. |

By reviewing the @availabilityWindow attribute at step 611, the DASH client may determine when to transmit key request 613 and/or IV request 615.

Figure 7:
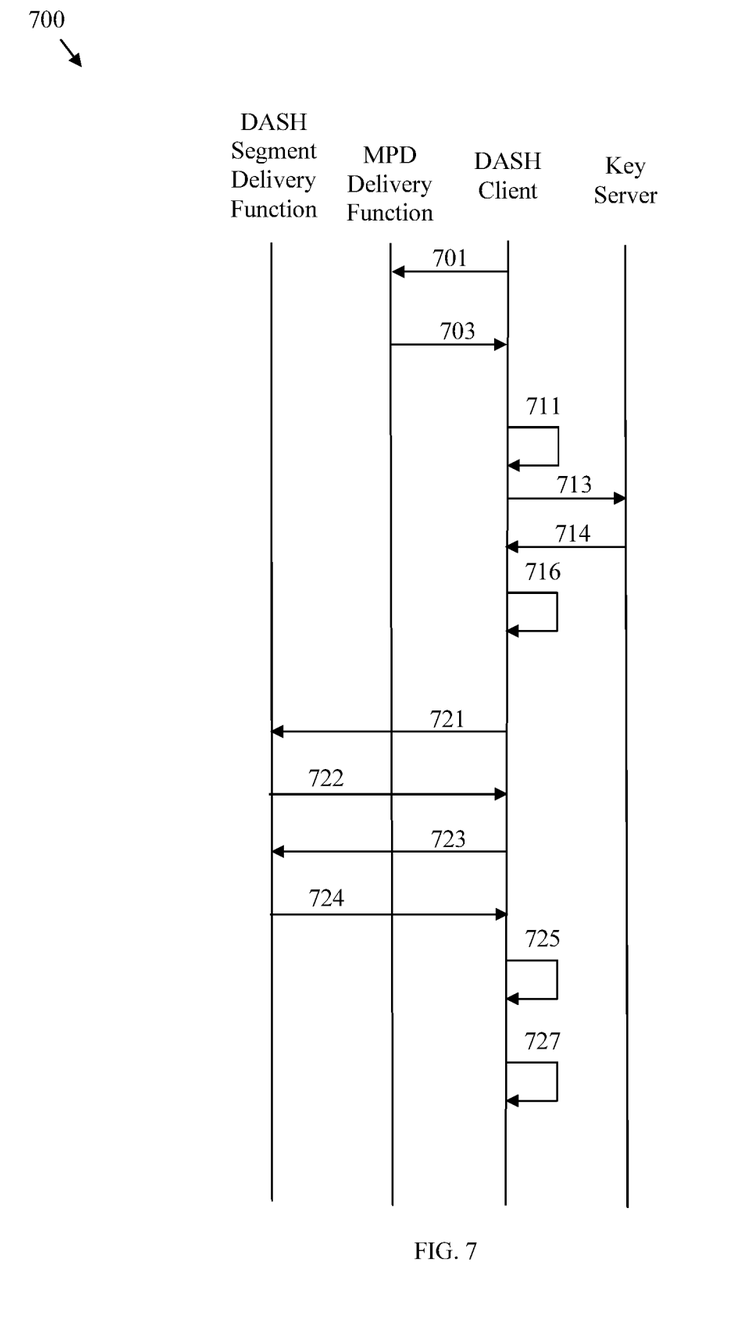
FIG. 7 is a protocol diagram of an embodiment of a method of deriving a DASH IV.

FIG. 7 is a protocol diagram of an embodiment of a method 700 of deriving a DASH IV. Steps 701, 703, and 711 may be substantially similar to steps 601, 603, and 611. At steps 713-714, the DASH client may request and receive, respectively, a key for segment decryption in a manner substantially similar to steps 613-614. At step 716, the DASH client may derive a DASH IV for use in conjunction with the key in decrypting the segment indicated by the MPD. The MPD may indicate that the key and a particular cipher are to be used to decrypt the segment. It should be noted that a cipher, key, and IV used to decrypt a segment may also have been used to encrypt the segment (e.g. at the DASH segment delivery function). The segment may also be numbered. The DASH client may perform an ECB mode encryption on the segment number using the same cipher used to encrypt the segment and the key received at step 714, which may also be the same key used to encrypt the segment. The result of the ECB encryption may be the IV. At steps 721-722, the DASH client may request and receive, respectively, the encrypted segment in manner substantially similar to steps 621-622. At steps 723-724, the DASH client may obtain a MAC for authentication in a manner substantially similar to steps 623-624. At step 725, the DASH client may decrypt the segment using the derived IV, the key from step 714, and the cipher used to derive the IV. As such, the same key and cipher may be used to derive the IV and decrypt the segment. At step 727, the DASH client may authenticate the segment using the MAC from step 724 prior to forwarding the segment to a media engine in a manner substantially similar to step 624. As shown above, method 700 may allow the IV to be derived at the DASH client which may alleviate the need for the key server request and response of steps 615-616. As such, deriving the IV on the DASH client may reduce the interaction with the key server. The elimination of steps 615-616 may significantly reduce overall load on the key server as a media presentation may comprise a plurality of encrypted segments and the key server may be required to respond to an IV request such as in step 615 from each DASH client for all encrypted segments.

As noted above, the MPD may indicate to a DASH client that an IV may be derived according to method 700. For example, an adaptation set and/or a representation with which an encrypted segment may be associated may comprise a ContentProtection element. The ContentProtection element may comprise an @ivEncryptionFlag attribute. The @ivEncryptionFlag may be optional with a default value of true. As shown below, when the @ivEncryptionFlag is set to true, a DASH client processing the MPD (e.g. at step 711) may determine to derive the IV according to step 716 and may not request the IV from the key server.

| Element or Attribute Name | Use | Description |
|---|---|---|
| ContentProtection | | |
| @ivEncryptionFlag | OD | When set to 'true', and Segment Number is used for derivation of the initialization vector (in 6.4.4.1), the initialization vector is Segment Number encrypted using the same cipher and the key as the segment itself. Default value is 'true'. |

Figure 8:
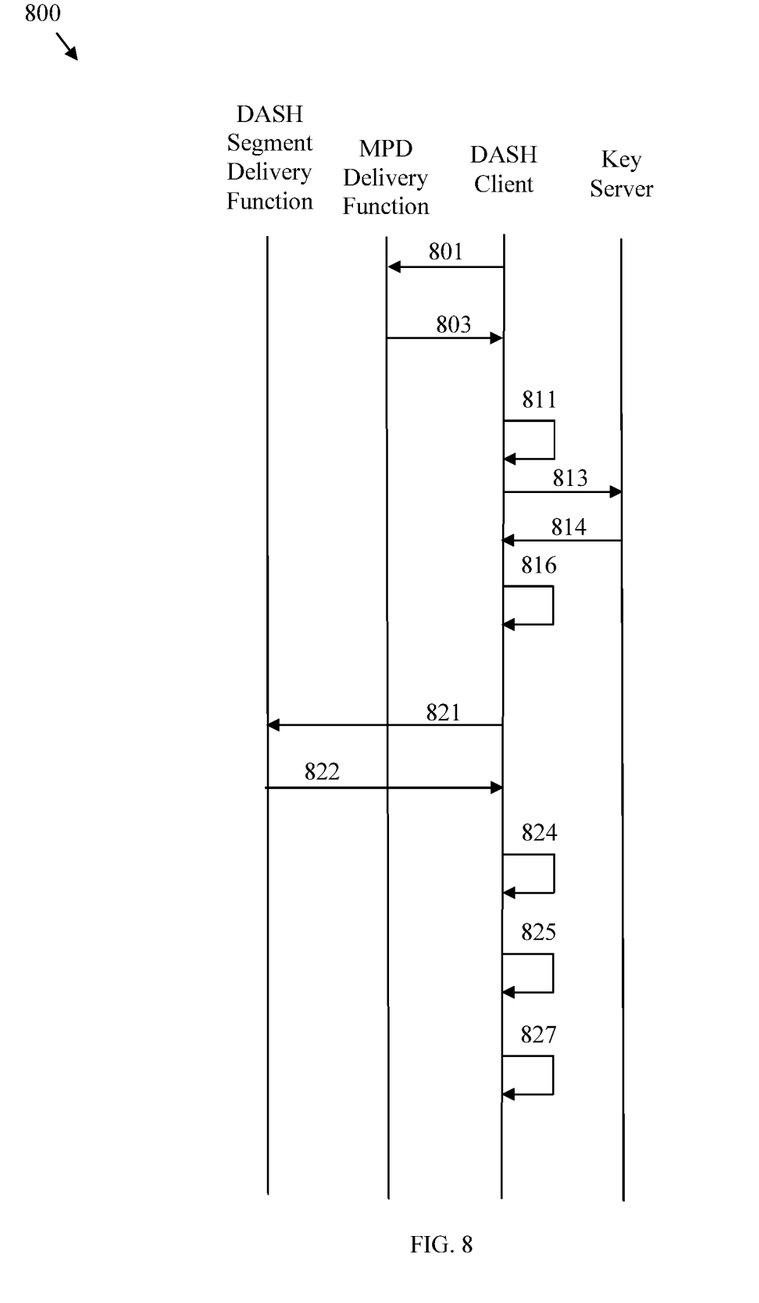
FIG. 8 is a protocol diagram of an embodiment of a method of inband authentication.

FIG. 8 is a protocol diagram of an embodiment of a method 800 of inband authentication. Method 800 may comprise steps 801, 803, 811, 813, 814, 816, and 821, which may be substantially similar to steps 701, 703, 711, 713, 714, 716, and 721. At step 822, the DASH client may receive the segment requested in step 821 in a manner similar to step 722. However, the MAC may be appended to the end of the segment data (e.g. an inband transmission). For example, the segment may be transmitted to the DASH client as a plurality of MPEG-2 TS packets, and the MAC may be encoded in the last MPEG-2 TS packet. As another example, the segment may be transmitted to the DASH client as a plurality of ISO-BMFF boxes, and the MAC may be encoded in the last ISO-BMFF box. At step 824, the DASH client may remove the MAC from the segment. The segment may then be decrypted and authenticated at steps 825 and 827, respectively, in a substantially similar manner to steps 725 and 727. The authentication of step 825 may employ the MAC from step 822, which may alleviate the need for MAC request and response 723-724 (e.g. an out of band transmission). As each segment may be authenticated by each DASH client prior to presentation, the removal of steps 723-724 may significantly reduce the load on the DASH segment delivery function when large numbers of DASH clients have requested a particular media content stream.

As noted above, the MPD may indicate to a DASH client that a MAC may be received inband according to method 800. For example, an adaptation set and/or a representation with which a segment may be associated may comprise a ContentSignature element. The ContentSignature element may comprise an @inbandSignature attribute. The @inbandSignature attribute may be optional with a default value of true or a default value of false, depending on the embodiment. As shown below, when the @inbandSignature is set to true, a DASH client processing the MPD (e.g. at step 811) may determine to obtain the MAC from segment data according to step 824 and may not request the MAC from the HTTP server. Other potential ContentSignature attributes are also shown below.

| Element or Attribute Name | Use | Description |
|---|---|---|
| ContentSignature | | |
| @signatureUrlTemplate | CM | Specifies the template for creating the URL used for retrieving the signature value. Can be absent if @inbandSignature is true |
| @signatureLength | O | Specifies the length of the signature. It shall appear only if the length is shorter than the normal output size of the signature algorithm. |
| @keyUrl | M | Specifies the URL for the key used for the signature. |
| @inbandSignature | OD | If true, MAC appears inband. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and proceeded with an @.

The DASH segment delivery function may be configured to place the MAC at the end of the segment data transmitted at step 821 depending on the type of segment transmitted. For example, the DASH segment delivery function may execute the following program code to encode a MAC at the end of an MPEG-2 TS packet stream comprising a segment:

| Syntax | No. of bits | Format |
|---|---|---|
| authentication_descriptor{ | | |
| descriptor_tag | 8 | Uimsbf |
| descriptor_length | 8 | Uimsbf |
| key_id_flag | 1 | Bslbf |
| Reserved | 1 | Bslbf |
| signature_length | 8 | |
| algorithm_id | 6 | Bslbf |
| if ( key_id_flag == 1 ) { | | |
|    key_id | 128 | uismbf |
| } | | |
| for ( i = 0; i < N; i++ ) { | | |
|    // everything above this line | | |
|    // is authenticated | | |
|    signature_byte | 8 | uismbf |
| } | | |
| } | | |

Uimsbf may indicate an unsigned integer with most significant bit first in an MPEG-2 packet. BSlbf may indicate a bit string with left bit first. key_id_flag if set to true may indicate that a key identifier may be used to identify the key used for the associated signature. algorithm_id may comprise an algorithm which may be used for generating a digital signature. The following table may indicate algorithm assignment values where sha1 is a secure hash algorithm and hmac-sha1 is a hash based message authentication code secure hash algorithm.

| algorithm_id | value | Notes |
|---|---|---|
| 0x00 | sha1 | May be useless unless used with encrypted content |
| 0x01 | hmac-sha1 | | key_id may indicate an opaque key ID, which may be used to determine the key used for signature generation. signature_length may indicate a signature length in 32-bit words. Signature may be a MAC that may be used to authenticate the data from the beginning of the segment to the first byte of the MAC.

The MAC may be positioned in a MPEG-2 TS packet in an field related to an adaptation set. The packet may not carry any payload data or any program clock reference (PCR) data to allow for simple insertion and/or extraction without introduction of continuity errors at segment and/or subsegment concatenation. The MAC packet may be indicated on a PCR packet identifier (PID) table associated with the packet stream.

As another example, the DASH segment delivery function may execute the following program code to encode a MAC at the end of an ISO-BMFF box stream comprising a segment:

```
aligned(8)  class  AuthenticationBox  extends  Box('auth')  {
unsigned int(1)   key_id_flag
unsigned int(1)   reserved
unsigned int(6)   algorithm_id;
unsigned int(8)   signature_size;
unsigned int(8)   key_id[16];
// everything above this line is authenticated
unsigned int(8)   signature[4*signature_size_words];
}
```

The semantics of the ISO-BMFF box code may be substantially similar to the semantics (e.g. definitions, requirements, etc.) of the MPEG-2 TS code.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a receiver configured to receive, from a Hypertext Transfer Protocol (HTTP) server, a Dynamic Adaptive Streaming over HTTP (DASH) media presentation description (MPD) describing a media presentation and comprising a function, a key server uniform resource locator (URL), and a ContentProtection element, wherein the function is for the apparatus to calculate a request time to retrieve a decryption key for an encrypted segment of the media presentation, wherein the request time occurs in an availability window, wherein the encrypted segment is associated with an initialization vector (IV) for use in conjunction with the decryption key, wherein the key server URL points to a key server that provides the decryption key, and wherein the ContentProtection element comprises an availability attribute;
   a processor coupled to the receiver and configured to calculate the request time using the function; and
   a transmitter coupled to the processor and configured to transmit, to the key server via the key server URL during the request time, a request for the decryption key,
   wherein the receiver is further configured to receive the decryption key from the key server and in response to the request,
   wherein the processor is further configured to derive the IV by performing an electronic codebook (ECB) mode encryption on a segment number of the encrypted segment by applying the decryption key, and
   wherein the receiver, the transmitter, or both the receiver and the transmitter are at least partially implemented in hardware.

2. The apparatus of claim 1, wherein the request time occurs at least one second prior to an available segment time.

3. The apparatus of claim 1, wherein the receiver is further configured to receive the IV.

4. The apparatus of claim 3, wherein the receiver is further configured to further receive the IV during the availability window.

5. The apparatus of claim 1, wherein the function is a random value function.

6. A computer program product comprising computer executable instructions stored on a non-transitory computer readable medium that when executed by a processor cause a client to:
   receive, from a Hypertext Transfer Protocol (HTTP) server, a Dynamic Adaptive Streaming over HTTP (DASH) media presentation description (MPD) describing a media presentation as an encrypted segment and comprising a function and a key server uniform resource locator (URL), wherein the function is for the client to calculate a request time during an availability window to retrieve a decryption key for the encrypted segment, and wherein the key server URL points to a key server that provides the decryption key;
   calculate the request time based on the function;
   transmit, to the key server via the key server URL during the request time, a request for the decryption key;
   receive the decryption key from the key server and in response to the request; and
   create an initialization vector (IV) for the encrypted segment by performing an electronic codebook (ECB) mode encryption on a segment number of the encrypted segment by applying the decryption key.

7. The computer program product of claim 6, wherein the instructions further cause the client to decrypt the encrypted segment by applying the IV and the decryption key.

8. The computer program product of claim 6, wherein the encrypted segment is encrypted by a cipher and the decryption key, and wherein the instructions further cause the client to further create the IV by applying to the segment number the decryption key and the cipher.

9. The computer program product of claim 8, wherein the DASH MPD comprises an attribute to indicate an encryption scheme associated with the encrypted segment.

10. The computer program product of claim 9, wherein the attribute is set to a value of 'true' to indicate that the encrypted segment should be decrypted by applying the decryption key, the cipher, and the IV and applying the decryption key and the cipher to the segment number.

11. The computer program product of claim 6, wherein the function is a random value function.

12. A method implemented in a client, the method comprising:

receiving, from a Hypertext Transfer Protocol (HTTP) server and using a transceiver, a Dynamic Adaptive Streaming over HTTP (DASH) media presentation description (MPD), wherein the MPD describes a media presentation as an encrypted segment, indicates that the encrypted segment is associated with a decryption key, an initialization vector (IV), and an availability window, and comprises a function, for the client to calculate a request time during an availability window to retrieve the decryption key;

calculating the request time using the function;

transmitting, to a key server during the request time, a request for the decryption key;

creating the IV for the encrypted segment by performing an electronic codebook (ECB) mode encryption on a segment number of the encrypted segment by applying the decryption key; and obtaining, using the transceiver, the encrypted segment during the availability window.

13. The method of claim 12, wherein the MPD comprises an IV encryption flag set to indicate a segment number that should be used for derivation of the IV.

14. The method of claim 12, wherein the function is a random value function.

\* \* \* \* \*